Feb. 25, 1958 G. F. JENKINS ET AL 2,824,699
CONTROL APPARATUS WITH VARIABLY BIASED AMPLIFIER
Filed Sept. 3, 1953
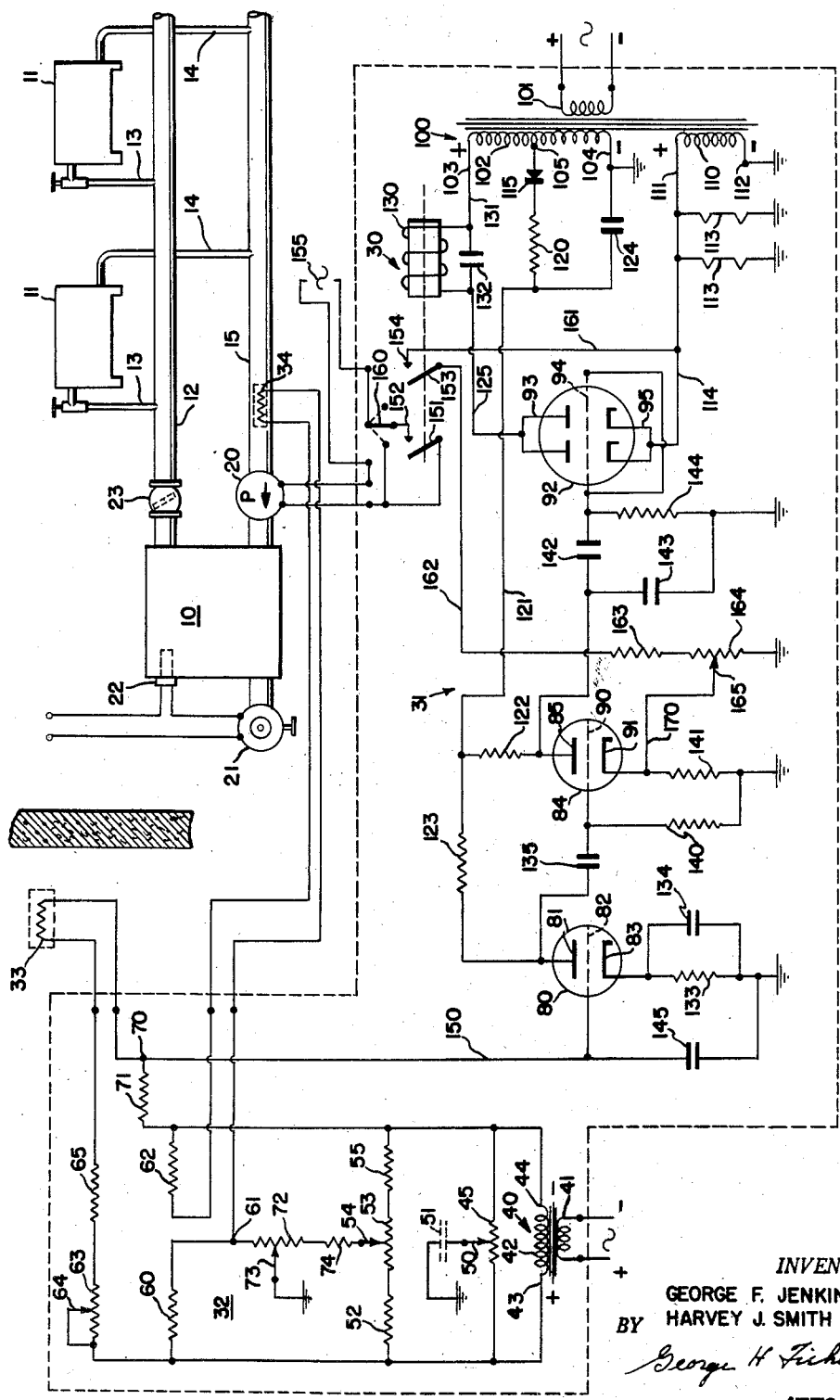
INVENTOR.
GEORGE F. JENKINS
BY HARVEY J. SMITH
ATTORNEY United States Patent Office 2,824,699
Patented Feb. 25, 1958

2,824,699

CONTROL APPARATUS WITH VARIABLY BIASED AMPLIFIER

George F. Jenkins, St. Paul, and Harvey J. Smith, St. Louis Park, Minn., assignors to Minneapolis-Honeywell Regulator Company, Minneapolis, Minn., a corporation of Delaware Application September 3, 1953, Serial No. 378,196

4 Claims. (Cl. 236—91)

The present invention is concerned with an improved condition control apparatus. More particularly, it is directed to providing an electronic amplifier which has an improved means provided therewith for changing the operating differential between the effective operating values of the control signals.

In many applications of such a control apparatus it is desired to have long periods of operation of the condition changing means, such as a fuel burner in a hot water heating plant. Generally relays used in such control apparatus require a greater value of voltage to energize the relay than the value necessary to maintain the relay operated. This difference in voltage between the "pull-in" and the "drop-out" voltage is known as the operating differential of the relay. To provide for longer periods of operation of the burner the operating differential can be increased to require a greater temperature change in the heating plant before the burner is deenergized.

The present invention provides an amplifier which energizes a control relay in temperature control apparatus, with circuit means for increasing the effective operating differential once the control relay has been energized by the amplifier. Such a provision makes it possible for the control apparatus to prevent unduly short operating periods of the fuel burner and still maintain the temperature within close limits of the desired temperature.

It is an object of the present invention to provide control apparatus including an amplifier controlling switching relay wherein the differential of the relay can be easily and effectively varied.

A further object of the present invention is to provide control apparatus having an amplifier and a relay in which the differential between the voltage required to energize the relay and the voltage at which deenergization of the relay occurs can be readily changed by an adjustment means in the amplifier.

These and further objects and advantages will be apparent upon a consideration of the present disclosure wherein the single figure is a schematic view of the present apparatus as applied to a hot water heating system.

The temperature control apparatus shown is of the sort generally used where there is no properly representative location for a room thermostat or where for other reasons a room thermostat is not desired. In a system as shown, a boiler 10 supplies hot water to radiators 11 through a main 12 and risers 13. Water returns from the radiators by risers 14 connected to a return main 15 connected to the boiler through a circulating pump 20. The water temperature in the boiler is maintained at a predetermined value by a burner 21 controlled by a temperature responsive unit 22 responsive to boiler water temperature. A flow valve 23 in the supply main prevents circulation of the water by thermosiphon action and only opens upon the operation of circulator pump 20. It is apparent that the amount of heat supplied to radiators 11 will be proportional to the temperature and circulation of the water that is circulated in the system. Upon a need of heat in the installation it is only necessary to energize circulator 20 which will immediately circulate the hot water stored in boiler 10.

The heating system and more particularly circulator pump 20, is controlled by a relay 30 which in turn is controlled by an amplifier 31. Amplifier 31 is controlled by bridge network circuit 32 comprising an outdoor temperature responsive resistance element 33 and a temperature responsive resistance element 34 located in return main 15 of the heating installation.

Bridge network circuit 32 has a power transformer 40 having a primary winding 41 connected to a source of power and a secondary winding 42 having two terminals 43 and 44. Connected to these terminals are several parallel branch circuits. The first of these branch circuits includes a resistor 45 having a movable tap 50 connected through condenser 51 to ground. A second of these circuits includes a resistor 52, a resistor 53 having a movable tap 54 thereon, and a resistor 55. A third parallel branch circuit includes a resistor 60, a tap 61, temperature responsive resistance element 34, and a resistor 62. A fourth parallel circuit connected between the end terminals 43 and 44 includes a variable resistor 63 having a movable tap 64, a resistor 65, outdoor temperature responsive resistance element 33, a tap 70, and a resistor 71. Connected between tap 61 and the movable wiper 54 is a resistor 72 and a resistor 74, resistor 72 having a movable tap 73 connected to ground.

Movable tap 50 is positioned on resistor 45 to balance out the capacitance of the bridge network circuit 32 which varies with the length of the leads necessary to connect elements 33 and 34 to the bridge. Movable wiper 54 is used for factory calibration of the bridge circuit. Movable wiper 73 is positioned along resistor 72 for "full heat" calibration, this adjustment being made to select that value of temperature of element 33 or outside temperature which will require continuous energization of the relay 30. For the values of components shown in the table hereafter, adjustment of movable wiper 73 from one end to the other of resistor 72 will provide for a "full heat" calibration range from plus 40 degrees to minus 80 degrees Farenheit. The movable wiper 64 on the resistor 63 provides for the "no heat" calibration. The "no heat" calibration is that temperature at which outdoor element 33 must be for no operation of relay 30 at a given temperature for element 34. Movement of wiper 64 from one end to the other on resistor 63 provides a range from 55 degrees to 75 degrees Farenheit.

Amplifier 31 includes an electron discharge device 80 having a plate 81, a control electrode 82 and a cathode 83; an electron discharge device 84 having an anode 85, a control electrode 90 and a cathode 91; and an electron discharge device 92 having a pair of anodes 93 connected together, a pair of control electrodes 94 connected together, and a pair of cathodes 95 connected together. A power supply transformer 100 has a primary winding 101 connected to a source of power, a secondary winding 102 having two end terminals 103 and 104 and a center tap 105, and a second secondary winding 110 having terminals 111 and 112. The terminals 104 and 112 are connected to a ground connection. Secondary winding 110 furnishes power to the cathode heaters 113 of the electron discharge devices 80, 84 and 92 by a connection from terminal 111 through two parallel circuits each comprising two filament heaters to ground. End terminal 111 is also connected by a conductor 114 to cathode 95 of electron discharge device 92. While the amplifier is shown with electron discharge devices, the substitution of transistors or any other current amplification means should be apparent to one skilled in the art.

Voltage is supplied to the anodes of electron discharge devices 80 and 84 from the center tap 105 through a rectifier 115, a resistor 120, a conductor 121, an anode resistor 122 to anode 85, and from conductor 121 through an anode resistor 123 to anode 81. A condenser 124 is connected between conductor 121 and terminal 104 to provide for a filtering action of the voltage supplied to the discharge devices. Anodes 93 of electron discharge device 92 are connected to terminal 103 through a circuit as follows; a conductor 125, a relay winding 130 of relay 30, and a conductor 131. Connected in parallel with relay winding 130 is a capacitor 132 for maintaining the relay in an energized position even though the voltage that is supplied to the relay is a pulsating voltage, for the capacitor stores a charge which is discharged through the relay winding during the half cycles of no voltage pulse. Cathode 83 is connected to ground through parallel circuits comprising a resistor 133 and a capacitor 134. Anode 81 is connected to control electrode 90 by a coupling capacitor 135, control electrode 90 also being connected to ground through resistor 140. Cathode 91 is connected to ground through a resistor 141 and anode 85 is connected to control electrodes 94 through a coupling capacitor 142. Anode 85 is also connected to ground through a capacitor 143 and control electrodes 94 are also connected to ground through a resistor 144. Control electrode 82 is connected to ground through a capacitor 145 and to tap 70 by a conductor 150. It is thus apparent that the output of bridge network circuit 32, comprising the voltage between the ground connection of movable wiper 73 and tap 70 is applied to the input of amplifier 31.

Relay 30 has a pair of switches comprising a blade 151 and a contact 152 and a blade 153 and a contact 154. Circulating pump 20 is connected to a source of power 155 through a circuit comprising blade 151 and contact 152 and a switch 160 which, when in the position shown, provides for automatic control of circulating pump 20. Switch 160 can also be positioned to open the power supplying circuit to provide for no operation of the circulator pump and may also provide for continuous operation of the pump by a circuit bypassing blade 151 and contact 152.

Contact 154 is connected to conductor 114 by a conductor 161 and blade 153 is connected to ground through a circuit including a conductor 162, a resistor 163 and a resistor 164, resistor 164 having a movable tap 165 thereon connected to cathode 91 by a conductor 170. Adjustment of movable wiper 165 on resistance 164 provides for an additional cathode positive bias to electron discharge device 84 when the relay 30 is energized to increase the operating differential of the relay.

With the values shown in the table below and wiper 165 at the lower end of resistor 164 a minimum resistance, approximately 0.4 ohm, change in either element 33 or element 34 is effective to cause energization and deenergization of relay 130. When wiper 165 is at the upper end of resistor 164, the operating differential of the relay is increased to require approximately 8 ohms change in resistance in either element 34 or element 90. Thus the operating differential can be changed in a manner not affecting the calibration of bridge network circuit 32 and without placing an additional load on the amplifier.

A table of values of the components found to be satisfactory is as follows:

*Table of values*

| Item: | Value |
| --- | --- |
| Resistor 45 | 50K (ohms). |
| Resistor 52 | 1K. |
| Resistor 53 | 40. |
| Resistor 55 | 1.06K. |
| Resistor 60 | 577. |
| Resistor 62 | 100. |
| Bulb 33 | 325. |
| Bulb 34 | 500. |
| Resistor 63 | 25. |
| Resistor 65 | 175. |
| Resistor 71 | 533. |
| Resistor 72 | 10K. |
| Resistor 74 | 2700. |
| Relay 130 | 7100. |
| Capacitor 132 | 16 mf. (microfarads). |
| Capacitor 124 | 10. |
| Capacitor 142 | 0.047. |
| Capacitor 143 | 0.01. |
| Capacitor 135 | 0.047. |
| Capacitor 134 | 50. |
| Capacitor 145 | 0.1. |
| Resistor 123 | 270K (ohms). |
| Resistor 133 | 2200. |
| Resistor 122 | 270K. |
| Resistor 140 | 470K. |
| Resistor 141 | 100. |
| Resistor 163 | 220. |
| Resistor 164 | 100. |
| Resistor 144 | 470K. |
| Resistor 120 | 2200. |

| Item: | Type |
| --- | --- |
| Discharge device 80 and 85 (tube) | 12Ax7. |
| Discharge device 92 | 5963. |

| Transformer terminals: | Voltage |
| --- | --- |
| 111 to ground | 12.6 (volts). |
| 105 to ground | 130. |
| 103 to ground | 300. |
| 43 to 44 | 12. |

*Operation*

With the apparatus arranged as shown in the figure, bridge network circuit 32 is balanced and relay 30 is deenergized to disconnect circulating pump 20. Assume that the outdoor temperature decreases and element 33 decreases in resistance so that the output of bridge network circuit 32, as determined by the voltage measured at tap 70 with respect to ground, is more positive when the polarity of secondary winding 42 is such that terminal 43 is positive, as shown. The additional positive voltage applied to control electrode 82 of amplifier 31 tends to cause energization of electron discharge device 80, thereby reducing the voltage to control electrode 90. Such an input signal will cause electron discharge device 92 to conduct sufficiently to energize relay 30 and pull blades 151 and 153 against contacts 152 and 154, respectively. Immediately this causes circulating pump 20 to begin the circulation of hot water through the heating plant. Normally the input signal to the amplifier from the bridge network circuit would only have to be reduced a small amount as the normal differential, that is the difference between the pull-in and drop-out voltage of relay 30, is relatively small.

As the return water temperature increases and the temperature of resistance element 34 increases circulator pump 20 will only operate a short period before the signal from the bridge network circuit will decrease a sufficient amount to drop out relay 30. However, when blade 153 engages contact 154, an additional cathode bias is placed on electron discharge device 84 by that portion of the positive voltage drop across resistance 164 as selected by movable tap 165. This additional bias requires that the input signal to the amplifier be reduced more than normally before relay 30 will be deenergized and results in longer periods of operation of the circulator pump for a given unbalance of bridge circuit 32.

The operating differential of relay 130 is easily and readily changed without affecting the calibration of bridge circuit 32. Whatever the position of wiper 165 it has no effect on bridge 32 and amplifier 31 as long as relay 130 is deenergized and upon energization of relay 130 only the degree of rebalance of the bridge circuit necessary to deenergize relay 130 is changed, thus providing a wider than normal operating differential for the relay.

Electrical leakage between the adjacent blades 151 and 153 of the relay which is prevalent during humid atmospheric conditions or upon the existence of lint and dust is of little consequence on the operation of the amplifier. The cathode resistance of discharge device 84 is maintained relatively small so that the position of wiper 165 does not effect the gain of the amplifier.

While we have shown our invention as applied to temperature control apparatus, it is obvious to those skilled in the art that there may be many other applications of this type of control apparatus and we therefore intend to limit our invention only by the scope of the appended claims in which we claim:

1. In a temperature control apparatus, relay means for controlling a temperature changing apparatus; network circuit means comprising a source of electrical power having two output terminals and a plurality of parallel circuit branches connected between said output terminals, a first branch including a resistance element with a movable tap thereon, a second branch including a tap and an electrical impedance means variable in accordance with a condition indicative of a need of operation of the temperature changing apparatus, and a third branch including an output tap and an electrical impedance means variable in response to the heating load; connection means including a resistance element having a grounded movable tap thereon for connecting said tap of the second branch to said movable tap of the first branch; an electronic amplifier comprising a plurality of electron discharge devices; a resistance element having a movable tap thereon for connecting a cathode of one of said discharge devices to a ground connection; a second source of electrical potential; circuit means electrically isolated from said network circuit means including said relay means for connecting said second source to said resistance element; circuit connection means connecting said output tap to said amplifier means; and further circuit means for connecting said amplifier means in controlling relation to said relay means whereby the operating differential of said relay means is changed by the position of said movable tap as a portion of said second source is available to said cathode.

2. In a temperature control apparatus, electrical relay means for controlling a temperature changing apparatus, said relay means; network circuit means comprising a source of voltage having two output terminals and a plurality of parallel circuits connected between said output terminals, a first circuit including a resistance element with a movable tap thereon, a second circuit including a tap and an electrical impedance means variable in accordance with outdoor temperature, and a third circuit including an output tap and an electrical impedance means variable in accordance with the load of said temperature changing apparatus; electrical circuit means connecting said tap of the second circuit and said movable tap of the first circuit; electronic amplifying means comprising an electron discharge device, an input connection means, an output connection means, and a second source of voltage; differential selection means including a resistance element having two terminals and a movable tap, said selection means being electrically isolated from said network circuit connection means connecting said tap to a cathode of said discharge device and one of said terminals to ground, and further means including said relay means connecting said first source of voltage to the other of said terminals; and electrical connection means connecting said output tap to said input connection means and said output connection means to said relay means whereby upon energization of said relay means a portion of said second source is applied to said cathode to effectively change the operating differential of said relay means.

3. In control apparatus, an electronic amplifier, a relay, a source of control signal, means interconnecting said source, said amplifier and said relay in the order named, means including said source for causing said amplifier to energize said relay when the control signal is of a first value and deenergize said relay when of a lower second value, and circuit means electrically isolated from said source of control signal connected to a cathode of an electron discharge device within said amplifier for automatically changing the operating differential between said first and second values by a selected amount upon energization of said relay, said circuit means comprising a resistance having two end terminals and a tap, connection means connecting one of said terminals to ground and said tap to said cathode, a source of voltage, and further connection means including said relay for connecting said source of voltage to the other of said terminals.

4. In control apparatus, first means capable of responding to a need of change in a condition, second means capable of responding to a change in the condition, a network circuit comprising parallel branches connected to source of voltage, a first branch including an impedance having a tap, a second branch including a tap and said second means, and a third branch including an output tap and said first means; a relay; an amplifier comprising an input and outlet connection, means connecting said relay to said ouput, a variable bias source for said amplifier, and means electrically isolated from said network circuit including said relay for applying said bias to said amplifier to change its operating differential; and means connecting said output tap of said network circuit to said input of said amplifier.

References Cited in the file of this patent
UNITED STATES PATENTS

| | | |
|---|---|---|
| 2,236,624 | Littwin | Apr. 1, 1941 |
| 2,275,368 | Krause | Mar. 3, 1942 |
| 2,544,031 | Kyle | Mar. 6, 1951 |
| 2,553,060 | Miner | May 15, 1951 |
| 2,573,661 | Deubel | Oct. 30, 1951 |
| 2,602,916 | Anderson | July 8, 1952 |
| 2,703,679 | Shank et al. | Mar. 8, 1953 |
| 2,742,592 | Miller et al. | Apr. 17, 1956 |